United States Patent [19]

Mimura et al.

[11] Patent Number: 4,989,149

[45] Date of Patent: Jan. 29, 1991

[54] CONSTANT-SPEED RUNNING APPARATUS FOR VEHICLE

[75] Inventors: Munehiko Mimura; Takumi Tatsumi; Yasuo Naito; Kazuyori Katayama, all of Hyogo, Japan

[73] Assignee: Mitsubishi Denki Kabushiki Kaisha, Tokyo, Japan

[21] Appl. No.: 213,860

[22] Filed: Jun. 30, 1988

[30] Foreign Application Priority Data

Jul. 2, 1987 [JP] Japan .................. 62-167176

[51] Int. Cl.$^5$ ............... B60K 31/02; B60K 41/18; G05D 13/00

[52] U.S. Cl. ............... 364/426.04; 180/179; 364/424.1

[58] Field of Search ........... 364/424.1, 426.04; 180/175, 176, 177, 178, 179; 74/866; 474/12, 18, 28

[56] References Cited

U.S. PATENT DOCUMENTS

| | | | |
|---|---|---|---|
| 4,466,521 | 8/1984 | Hattori et al. | 74/866 |
| 4,506,752 | 3/1985 | Hara et al. | 180/179 |
| 4,540,060 | 9/1985 | Kawata et al. | 180/179 |
| 4,650,020 | 3/1987 | Mizuno et al. | 180/176 |
| 4,704,683 | 11/1987 | Osanai | 364/424.1 |
| 4,716,872 | 1/1988 | Pol | 180/176 |
| 4,735,112 | 4/1988 | Osanai et al. | 74/866 |
| 4,794,819 | 1/1989 | Tanaka et al. | 74/866 |
| 4,854,920 | 8/1989 | Mimura | 74/866 |

FOREIGN PATENT DOCUMENTS

| | | | |
|---|---|---|---|
| 305156 | 3/1989 | European Pat. Off. | 180/176 |
| 58-29018 | 2/1983 | Japan . | |
| 58-39311 | 3/1983 | Japan . | |
| 60-135335 | 7/1985 | Japan . | |

Primary Examiner—Felix D. Gruber
Attorney, Agent, or Firm—Sughrue, Mion, Zinn, Macpeak & Seas

[57] ABSTRACT

A constant-speed running apparatus for a vehicle comprising a throttle-valve actuator for activating a throttle-valve opening angle of a vehicle engine, a constant-speed running controller for controlling the throttle-speed running, a continuously variable transmission (CVT) which is constructed in a power transmission path of the vehicle engine, and a CVT controller for controlling a transmission-ratio of the CVT; further comprising a detecting element constructed in the constant-speed running controller for a control efficiency of the constant-speed running for detecting an acceleration demand of a driver and for informing the CVT controller of the demand; and further comprising a correction element for calculating a corrected transmission-ratio as a corrected vehicle acceleration corresponding to a target vehicle accelerating force on the basis of the acceleration demand detected by the detecting element.

7 Claims, 4 Drawing Sheets

CONSTANT-SPEED RUNNING APPARATUS FOR VEHICLE

BACKGROUND OF THE INVENTION

1. Field of the Invention

The present invention relates to a constant-speed running apparatus for a vehicle in which a desired accelerating force of the vehicle is obtained by changing a transmission ratio if the acceleration force is not enough when a driver specifies acceleration of the vehicle.

2. Description of the Prior Art

Conventional constant-speed running apparatus for vehicles are disclosed in the Japanese Patent Official Gazette, for example, a patent application laid-open No. 60-135335, a patent application laid-open No. 58-39311, and a patent application laid-open No. 58-29018. The same applicants have already filed a patent application No. 61-200562 relevant to the present invention, a conventional constant-speed running apparatus is disclosed in the specification of the above application.

FIG. 1 shows a block diagram briefly explaining one of the prior art devices mentioned above. FIG. 1 shows substantially the same structure as FIG. 3, which will be mentioned later, FIG. 3 is a block diagram showing a constant-speed running apparatus, for a vehicle according to the present invention. The prior art will be described with reference to FIG. 1. In FIG. 1, the numeral 100 denotes a constant-speed running controller, which comprises a vehicle speed detecting means 101, a vehicle-speed storage means 102, a desired-speed generating means 103, a cancel-signal generating means 104, a logical calculating means 105, and an actuator driving means 106.

A vehicle speed sensor 111 supplies an actual vehicle-speed Vw to the constant-speed running controller 100. The actual vehicle-speed Vw is detected by the detecting means 101 and outputted to the logical calculating means 105 to which the content stored in the vehicle-speed storage means 102 is also inputted. The vehicle-speed storage means 102 stores a desired vehicle-speed. Further, the numeral 112 denotes a main switch for activating the constant-speed running controller 100.

The numeral 120 denotes a group of command switches comprising a number of switches for setting driving conditions by the driver, that is, a setting switch 121, a COA switch 122, an ACC switch 123, and an RES switch 124.

The setting switch 121 is a command switch which stores a present vehicle-speed and controls vehicle-speeds on the basis of the stored vehicle-speeds.

The COA switch 122 is a command switch which is used when the present vehicle-speed is to be decelerated.

The ACC switch 123 is a command switch which is used when the present vehicle-speed is to be accelerated.

Some ACC switches carry out acceleration control in order to improve the accelerating feeling which a driver feels when he accelerates the vehicle.

The RES switch 124 is a command switch for obtaining a desired acceleration, deceleration, or constant speed condition to arrive at a speed previously stored.

The outputs of the respective switches of the above-mentioned command switch group 120 are supplied to the desired-speed generating means 103 of the constant-speed running controller 100.

The desired-speed generating means 103 generates desired-speed signals corresponding to the output of each switch of the command switch group 120 and outputs these desired-speed signals to the logical calculating means 105.

Further, the numeral 130 includes a cancel switch group comprising a clutch switch 131, breaking switch 132, and a canceling switch 133. The cancel switch group 130 supplies its output to the cancel-signal generating means 104 of the constant-speed running controller 100 in order to cancel a control function for driving at a constant-speed by the driver.

In general, it is well-known that the structure of the cancel switch group 130 and the command switch group 120 and how they are installed depend on the vehicles in which these switch groups are equipped, but they are equivalent in the functions to be performed.

The logical calculating means 105 carries out predetermined logical calculations on the basis of the outputs from the vehicle-speed detecting means 101, the vehicle-speed storage means 102, the desired-speed generating means 103, and the cancel-signal generating means 104, and then controls the actuator driving means 106 thereby causing a throttle actuator 140 to control an opening-angle of a throttle valve 150. Thus, constant-speed control at the desired running speed is affected.

A controller 200 for a continuously variable transmission (CVT) comprises a regulated oil-pressure generating means 201, an oil-pressure generating means for the varying speed 202, and a CVT actuator driving means 203.

The above controller 200 for the CVT is supplied with the outputs from an input rotational angle sensor 211 and an output rotational angle sensor 212 for obtaining an actual transmission-ratio, the output of a range position sensor 213 for bringing out a driving efficiency desired by the driver, the output of a throttle valve opening angle sensor 214 for obtaining a desired opening-angle of the throttle valve as a demanded acceleration amount of the driver, the output of an engine control information detecting means 220 for judging other conditions of the engine, and the output of a driving control information detecting means 230 for judging conditions for driving. Therefore, the controller 200 for the CVT drives an actuator 240 for regulating oil-pressure and an actuator 241 for an oil-pressure varying speed in order to control a transmission-ratio of a continuously variable transmission (CVT) 250 and also to regulate the pressure between a belt pulley and a V-belt.

FIG. 2 denotes a flowchart showing a flow of operation of the controller 200 for the CVT which is disclosed in the Japanese Patent Official Gazette of patent laid-open No. 60-135335.

In step S401 shown in FIG. 2, the controller 200 receives a throttle-valve opening angle $\theta$th from the throttle valve opening angle sensor 214, a rotational speed at input side Ni from the input rotational angle sensor 211, a rotational speed at output side No from the output rotational angle sensor 212, a driving efficiency Sel desired by the driver from the range position sensor 213, respectively.

The next step S402 is a decision routine for deciding whether a transmission-ratio compensation should be carried out or not. This decision routine generates a transmission-ratio compensating demand when the throttle-valve opening angle $\theta$th is fully open or fully closed. The operation of the controller 200 proceeds to the step S410 upon the transmission-ratio compensating demand.

The step S410 is a routine for processing various compensation. A target rotational speed of an input shaft Nis is calculated in the step S411, and in the step S412, a target transmission ratio Rs is calculated, thereby a transmission-ratio control is carried out.

In normal control of the transmission ratio, if it is decided in step S402 that a compensation is not necessary, an engine-generated torque τe is calculated by the engine characteristic routine of the step S403 on the basis of the throttle-valve opening angle θth and the input shaft rotational speed Ni which are read out in the step S401.

After that, the regulating oil-pressure actuator 240 is started after calculating a regulated oil-pressure on the basis of the engine-generated torque τe and the actual transmission-ratio R by means of a regulated oil-pressure calculation routine in the step S404.

Subsequently, the oil-pressure varying speed actuator 241 is driven after calculating, by means of a varying speed oil-pressure calculating routine in the step S405, a varying speed oil-pressure $P_R$ corresponding to the difference between the target rotational speed of the input shaft Nis and the actual input shaft rotational speed Ni.

In such a manner mentioned above, the transmission-ratio control for the CVT 250 is carried out.

However, in the process routine shown in FIG. 2, the throttle-valve opening angle is not opened sufficiently because of insufficient negative pressure when the vehicle runs on an up-hill at a constant speed. From this point of view, the conventional constant-speed driving apparatus is constituted such that a sufficient acceleration is gained by executing the transmission-ratio control.

Similarly, a force of an engine brake is regulated by the transmission-ratio control. Further, when the throttle-valve opening angle θth is fully open or totally closed causing insufficient engine brake force, the conventional constant-speed running apparatus is arranged in such a way that the transmission-ratio control is also applied to an ordinary control.

Further, the conventional apparatus cannot provide the transmission-ratio determined by ordinary transmission-ratio control of the CVT corresponding to the acceleration demanding command from the driver.

Therefore, when acceleration is required or acceleration is too large, precise vehicle acceleration cannot be obtained, thus the driver cannot feel acceleration corresponding to what he intended to get.

SUMMARY OF THE INVENTION

The present invention was made to solve the problems as described above, and an object of the present invention is to provide a constant speed running apparatus for a vehicle, wherein an approximate value of an engine torque can be measured, and accelerating force can be controlled easily by obtaining the transmission ratio for a desired vehicle acceleration, thereby providing the driver with an improved acceleration feeling.

A constant-speed running apparatus for a vehicle of the present invention comprises a control efficiency detecting means of a constant-speed running for detecting an acceleration demand from a driver, and correction means for correcting transmission-ratio of a continuously variable transmission in accordance with control-efficiency information of constant-speed running.

DETAILED DESCRIPTION OF THE PREFERRED EMBODIMENTS

Figure 3:
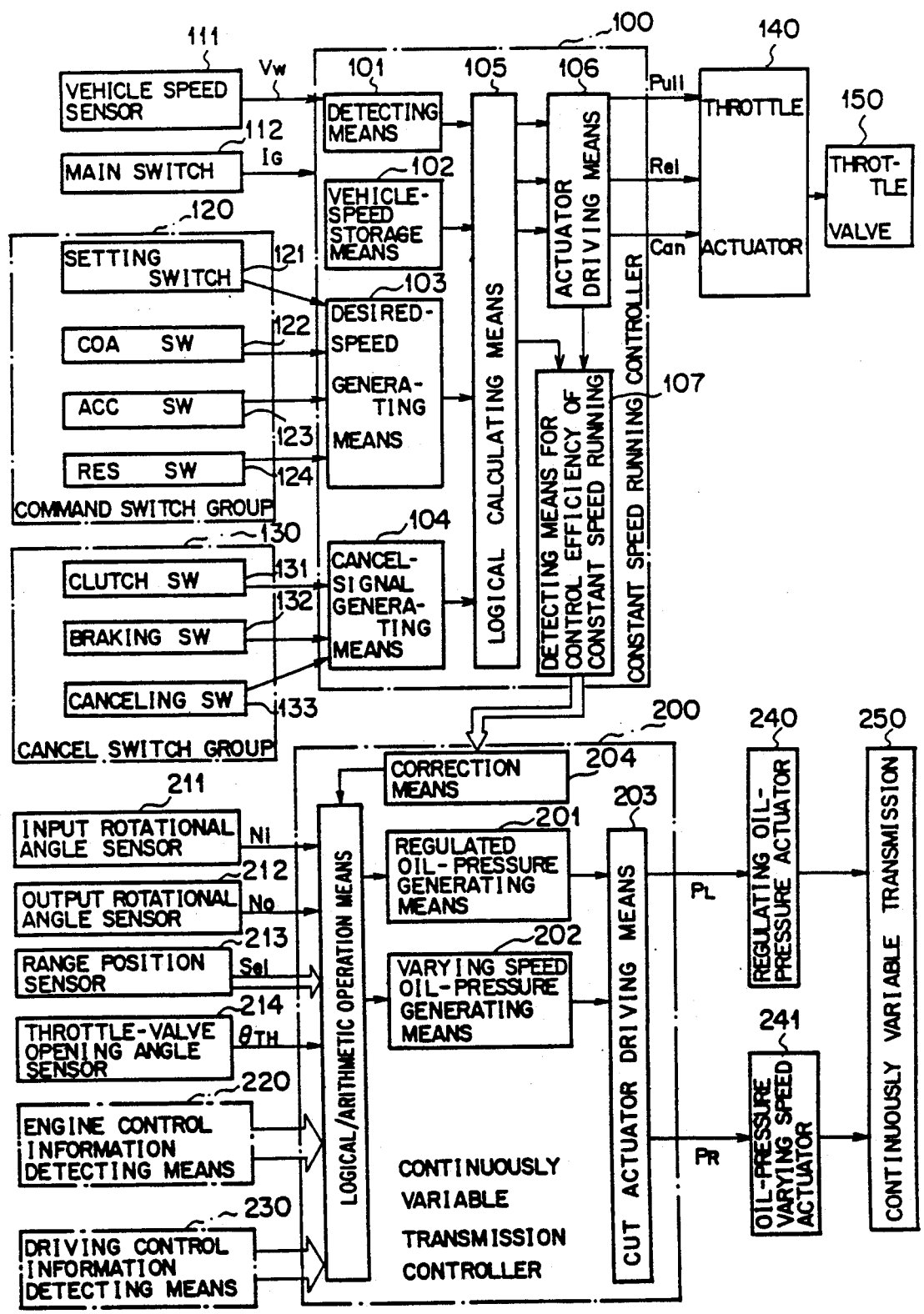
FIG. 3 is a block diagram showing one embodiment of a constant-speed running apparatus for a vehicle of the present invention.

Now, an embodiment of a constant-speed running apparatus for a vehicle of the present invention will be described with reference to the attached drawings. FIG. 3 is a block diagram for showing a construction of the embodiment. In FIG. 3, the parts different from the conventional apparatus will mainly be described.

According to the present invention, a detecting means 107 for control efficiency of constant-speed running is newly added to the constant-speed running controller 100, and a correction means 204 is also newly added to the CVT controller 200.

The detecting means 107 for control efficiency of constant-speed running is supplied with the outputs of the logical calculating means 105 and the actuator driving means 106; the output of the detecting means 107 for control efficiency of constant-speed running is supplied to the correction means 204. The other parts of the constant-speed running apparatus for a vehicle are the same as the conventional apparatus.

Figure 4:
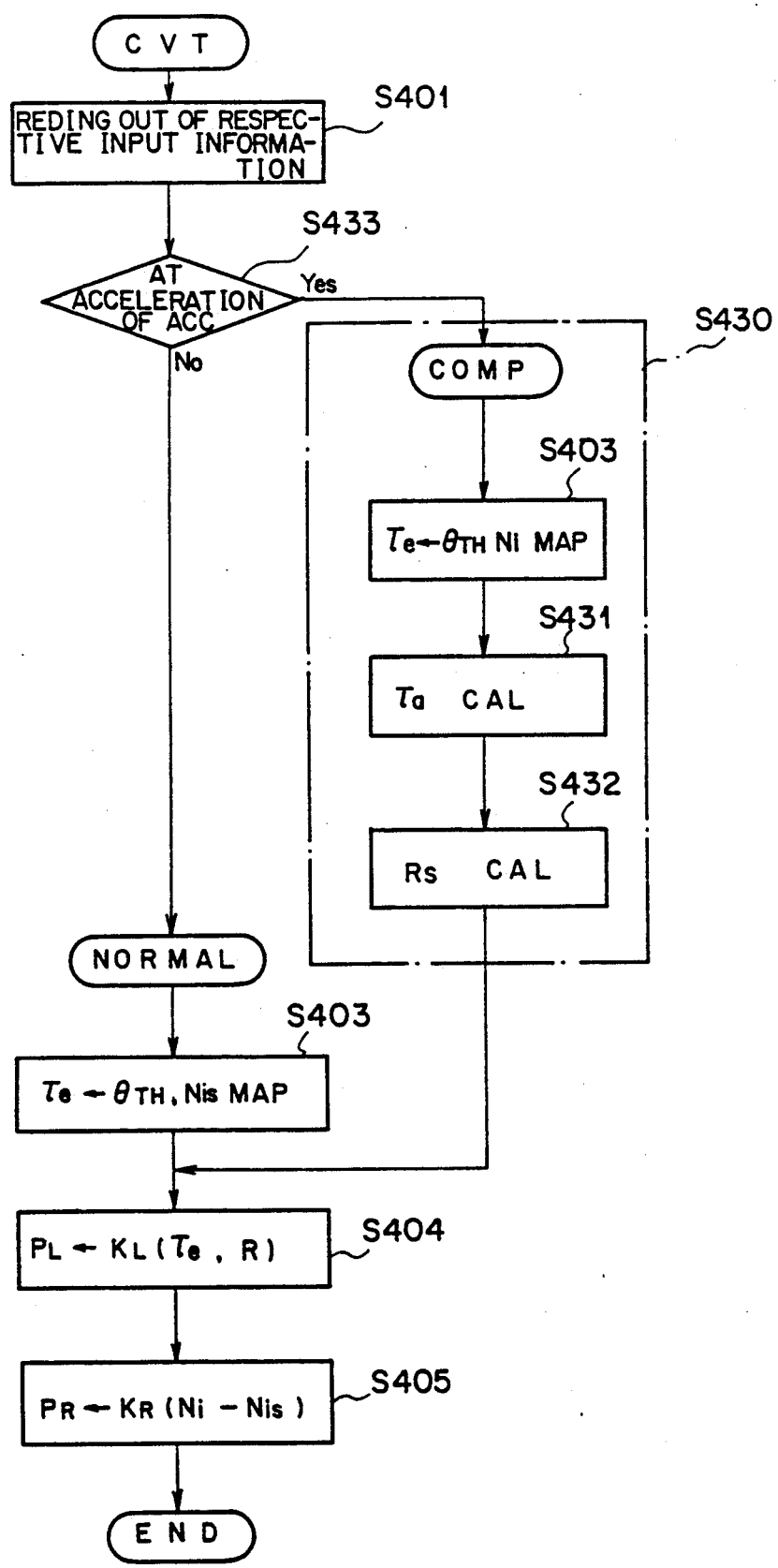
FIG. 4 is a flowchart showing an operation of the constant-speed running apparatus for a vehicle of the present invention shown in FIG. 3.

Next, an operation of the apparatus will be described with reference to the flowchart shown in FIG. 4. During normal running, in the step S401, the controller 200 receives respective input information, i.e., an input shaft rotational speed Ni from the input rotational angle sensor 211, an output shaft rotational speed No from the output rotational angle sensor 212, a range position signal Sel from the range position sensor 213, and a throttle-valve opening angle θth from the throttle valve opening angle sensor 214.

Figure 1:
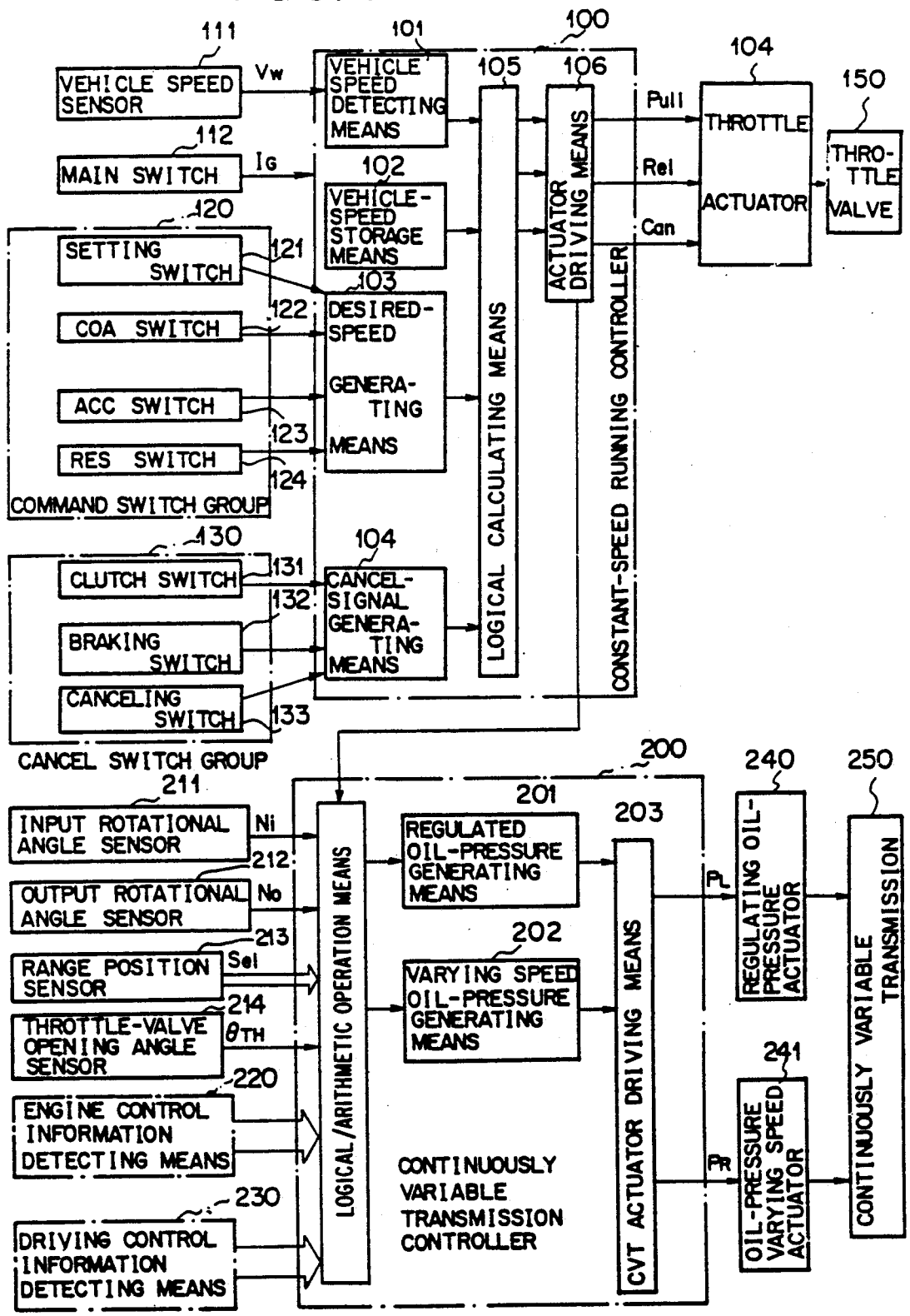
FIG. 1 is a block diagram showing a general construction of a conventional constant-speed running apparatus for a vehicle.
Figure 2:
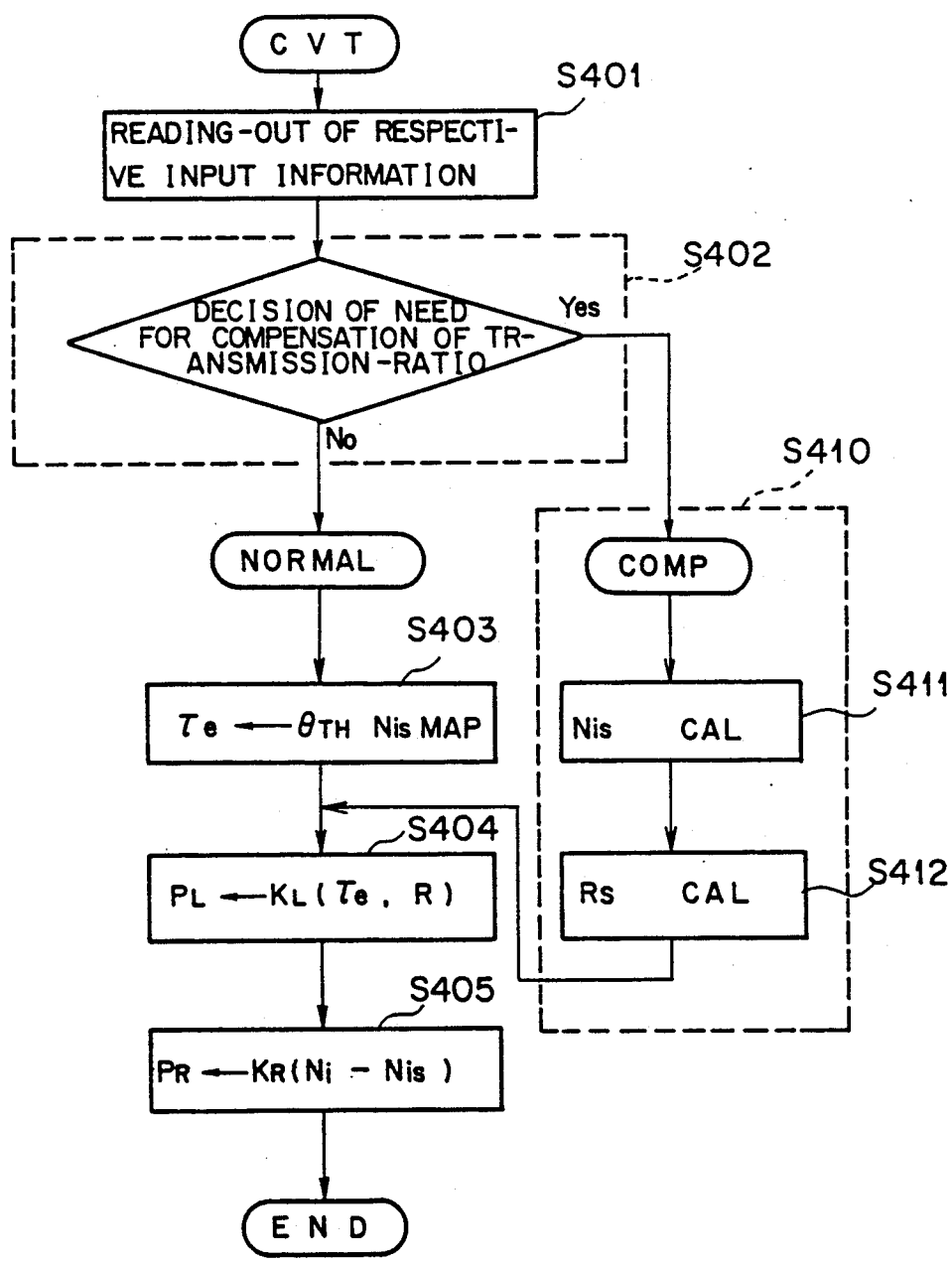
FIG. 2 is a flowchart showing the operation of a conventional constant-speed running apparatus for a vehicle shown in FIG. 1.

Further, in the step S433, if the command switch 123 for commanding acceleration from the present vehicle speed is not ON to supply the constant-speed running controller 100 with the acceleration command, the CVT controller 200 calculates the engine torque τe on the basis of the respective input information in the step S403 (the same engine characteristics routine as that in FIG. 2), the regulated oil-pressure $P_L$ is calculated on the basis of the engine torque τe and the transmission-ratio R in the step S404.

Transmission-ratio calculating routine in the step S405 calculates the transmission-ratio oil pressure $P_R$ corresponding to the difference (Ni-Nis) between the target input shaft rotational speed Nis and the actual input shaft rotational speed Ni.

The transmission-ratio oil pressure $P_L$ calculated in the above steps activates the actuator 240 for regulating oil-pressure, and the transmission-ratio oil pressure $P_R$ activates the actuator 241 for oil-pressure varying speed; therefore the transmission-ratio control of the CVT 250 is carried out by means of the regulating oil-pressure actuator 240 and the oil-pressure varying speed actuator 241.

Next, if the acceleration command for accelerating from the present vehicle speed is generated by turning the ACC switch 123 ON by the driver in the step S433, the processing of the transmission-ratio compensation routine in the step S430 is carried out, the throttle-valve opening angle is increased, and the vehicle acceleration is obtained by the transmission-ratio control.

Namely, in the transmission-ratio compensation routine in the step S430, the engine torque $\tau e$ is calculated on the basis of respective input information such as the throttle-valve opening angle $\theta$th and the input shaft rotational speed Ni in a similar manner to the step S403 described above.

Next, the vehicle acceleration $\tau a$ is calculated in the step S431. The vehicle acceleration $\tau a$ is expressed in terms of the engine torque $\tau e$ and the transmission-ratio R as follows.

$$\tau a = \tau e \times R \qquad (1)$$

Accordingly, the vehicle acceleration $\tau a$ can be varied easily by changing the transmission-ratio R to the low speed range (that is, the high torque range); therefore according to the invention, the detecting means 107 for detecting the control efficiency of the constant-speed running is provided in order to detect that ACC acceleration is under way when the ACC switch 123 is ON. The above-mentioned vehicle acceleration $\tau a$ is calculated on the basis of the engine torque $\tau e$ obtained by the present throttle-valve opening angle $\theta$th and the input shaft rotational speed Ni in the target transmission-ratio calculating routine in the step S432, then the correction means calculates the target transmission-ratio Rs corresponding to the target vehicle acceleration. The target transmission-ratio Rs corrects the transmission-ratio of the CVT 250.

As described above in detail, the constant-speed running apparatus of the present invention is arranged such that the detecting means for control efficiency of constant-speed running detects the acceleration demanding command by the driver, the correction means calculates the vehicle acceleration on the basis of the engine torque and the transmission-ratio of the CVT by calculating the transmission-ratio corresponding to the vehicle acceleration force on the basis of the above vehicle acceleration. Therefore, it is possible to estimate the engine torque on the basis of the acceleration demanding command by the driver and to set the transmission-ratio for obtaining the desired vehicle acceleration force.

Similarly, as it is possible to easily control the acceleration when accelerating, the driver can obtain an improved acceleration feeling.

What is claimed is:

1. A speed control and transmission ratio control apparatus for a vehicle comprises:
    a continuously variable transmission (CVT) mounted in a power transmission path of a vehicle engine;
    a throttle actuator for controlling a throttle-valve opening angle of said engine;
    a constant-speed running controller for supplying said throttle actuator with electrical signals in order to perform constant-speed running of a vehicle of the basis of an actual vehicle-speed and a driving condition set by a driver, wherein said controller has a detecting means for a control efficiency of a constant-speed driving for detecting an acceleration demands by the driver; and
    a continuously variable transmission controller for controlling a transmission-ratio of said CVT on the basis of respective input information of the vehicle, wherein said CVT controller has a correction means for calculating a vehicle acceleration on the basis of the transmission-ratio and an engine torque when the acceleration demand by the driver is detected by the detecting means for the control efficiency of the constant-speed running, and then calculating said transmission-ratio corresponding to a target vehicle acceleration force on the basis of said vehicle acceleration and thereby correcting said transmission-ratio of said CVT on the basis of the transmission-ratio according to a target vehicle acceleration force.

2. A speed control and transmission ratio control apparatus for a vehicle comprising a throttle actuator for controlling an opening angle of a throttle-valve of a vehicle engine, a constant-speed running controller for controlling said throttle actuator to perform constant speed running of the vehicle on the basis of driving conditions set by a driver, a continuously variable transmission (CVT) mounted in a power transmission path of said vehicle engine, and a CVT controller for controlling the transmission-ratio of said CVT on the basis of respective input information of said vehicle;
    wherein said constant-speed running controller has detecting means for a control efficiency of a constant-speed driving which detects an acceleration demand by a driver and informs said CVT of this demand; and
    wherein said CVT controller has correction means which calculate(s) a vehicle acceleration on the basis of an engine torque and the transmission-ratio in response to an acceleration demand detected output from said detecting means; determines a corrected transmission-ratio corresponding to a target vehicle acceleration force on the basis of said vehicle acceleration; and corrects the transmission-ratio of said CVT on the basis of said corrected transmission-ratio.

3. The speed control and transmission ratio control apparatus for a vehicle according to claim 2;
    wherein said constant-speed driving controller comprises,
    a vehicle-speed detecting means for detecting an actual vehicle speed Vw sensed by a vehicle-speed sensor,
    a set vehicle-speed storage means for storing a preset set vehicle-speed,
    a desired speed generating means for generating a desired-speed signal on the basis of outputs from a command switch group which is operated manually by a driver to drive the vehicle at an accelerated speed, a decelerated speed and a constant-speed,
    a cancel signal generating means for canceling a constant-speed running control function when the driver operates a cancel switch group to cancel the constant-speed driving,
    a logical calculating means for processing a predetermined logical operation on the basis of respective outputs from a vehicle speed detecting means, a set vehicle-speed storage means, a desired speed generating means and a cancel signal generating means, and an actuator driving means for controlling an operation of said throttle valve actuator on the basis of a controlling signal as a calculating result of said logical calculating means.

4. The speed control and transmission ratio control for a vehicle according to claim 3 wherein;

said constant-speed running controller has a main switch; and said command switch group comprises, a set switch for memorizing the present vehicle speed and for performing control of an actual vehicle speed on the basis of said memorized speed, a COA switch for causing deceleration of the actual vehicle speed, an ACC switch for causing acceleration of the actual vehicle speed and controlling acceleration to improve an acceleration feeling of the driver, and an RES switch for causing acceleration, deceleration or constant-speed for a target vehicle speed stored in advance.

5. The speed control and transmission ratio control for a vehicle according to claim 2 wherein;

said CVT controller comprises;

a regulated oil-pressure generating means for maintaining the oil-pressure of the CVT at a constant value on the basis of information sensed by the respective sensors, a varying speed oil-pressure generating means for generating a varying speed oil-pressure when it is necessary to change transmission ratio, and a CVT actuator driving means for receiving control outputs supplied from said regulated oil-pressure generating means and said varying speed oil-pressure generating means in order to drive a regulating oil-pressure actuator and an oil-pressure varying speed actuator driving said CVT.

6. The speed control and transmission ratio control apparatus for a vehicle according to claim 5, wherein said CVT controller is supplied with respective outputs from;

an input rotational angle sensor and an output rotational angle sensor for obtaining an actual transmission-ratio, a range position sensor for bringing out a driving efficiency desired by the driver, a throttle-valve opening angle sensor for sensing a throttle-valve opening angle indicative of an acceleration demanding command by the driver, an engine control information detecting means for judging other conditions of the engine, and a driving control information detecting means for judging driving conditions of the vehicle.

7. The speed control and transmission ratio control apparatus for a vehicle according to claim 2, wherein the control procedure of said CVT comprises the steps of:

reading out, by means of said CVT controller, input information such as an input shaft rotational speed Ni from an input rotational angle sensor, an output shaft rotational speed No from an output rotational angle sensor, a range position signal Sel from a range position sensor, and a throttle valve opening angle $\theta$th from a throttle valve opening angle sensor;

detecting, by means of said detecting means for the control efficiency of the constant-speed-driving constructed in said constant-speed running controller, an ACC acceleration affected by turning on an ACC switch and outputting an accelerating condition to said correction means incorporated in said CVT controller; and calculating, by means of said correction means, an engine torque $\tau e$ on the basis of said throttle-valve opening angle $\theta$th and said input shaft rotational speed Ni, calculating a vehicle acceleration force $\tau a$ on the basis of said engine torque $\tau e$ and a transmission ratio R by use of the following equation, $$\tau a = \tau e \times R$$

and calculating a target transmission-ratio corresponding to a target vehicle acceleration to correct a transmission-ratio of said CVT.

* * * * *